United States Patent
Zaccardi et al.

(10) Patent No.: US 11,280,204 B2
(45) Date of Patent: *Mar. 22, 2022

(54) AIR FLOW STRAIGHTENING ASSEMBLY AND TURBOMACHINE INCLUDING SUCH AN ASSEMBLY

(71) Applicant: SAFRAN AIRCRAFT ENGINES, Paris (FR)

(72) Inventors: Cédric Zaccardi, Moissy-Cramayel (FR); Kaëlig Merwen Orieux, Moissy-Cramayel (FR); William Henri Joseph Riera, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/096,832

(22) PCT Filed: Apr. 27, 2017

(86) PCT No.: PCT/FR2017/051002
§ 371 (c)(1),
(2) Date: Oct. 26, 2018

(87) PCT Pub. No.: WO2017/187093
PCT Pub. Date: Nov. 2, 2017

(65) Prior Publication Data
US 2019/0106998 A1    Apr. 11, 2019

(30) Foreign Application Priority Data
Apr. 27, 2016 (FR) ........................................ 1653756

(51) Int. Cl.
*F01D 9/04* (2006.01)
*F02K 3/06* (2006.01)

(52) U.S. Cl.
CPC ................ *F01D 9/042* (2013.01); *F02K 3/06* (2013.01); *F05D 2220/36* (2013.01);
(Continued)

(58) Field of Classification Search
CPC ..... F01D 9/00; F01D 9/02; F01D 9/04; F01D 9/041; F01D 9/042; F01D 5/282;
(Continued)

(56) References Cited

U.S. PATENT DOCUMENTS 4,131,387 A * 12/1978 Kazin ..................... F01D 5/141
                                                    415/119
5,131,808 A *  7/1992 Ciais ...................... F01D 5/282
                                                    415/135
(Continued)

FOREIGN PATENT DOCUMENTS

EP         0686554 A1   12/1995
FR         3016660 A1    7/2015
WO    WO 2014/076408 A1  5/2014

OTHER PUBLICATIONS

International Patent Application No. PCT/FR2017/051002, International Search Report and Written Opinion dated Jul. 24, 2017, 7 pgs. (relevance found in citations and English International Search Report).

*Primary Examiner* — Woody A Lee, Jr.
*Assistant Examiner* — Elton K Wong
(74) *Attorney, Agent, or Firm* — Lathrop GPM LLP

(57) ABSTRACT

The invention relates to a straightening assembly for an air flow of a turbomachine, comprising two respectively coaxial radially inner and outer shrouds (30), between which extend the vanes (32) made of composite material attached, at a first end portion (42) thereof, to the radially inner shroud and at a second end portion (44) thereof, to the radially outer shroud (30), with the vanes (32) comprising a useful portion extending between the two end portions (42, 44). According (Continued)

to the invention, for each vane (32) in a plane perpendicular to the axis of the radially inner and outer shrouds (30), a straight line passing through a junction between said first and second end portions (42, 44) and the useful portion forms, with a radius of the radially inner shroud passing through the junction between said first end portion and the useful portion of said vane (32), an angle $\alpha$ such that $0° < \alpha \leq 90°$.

13 Claims, 4 Drawing Sheets

(52) U.S. Cl.
CPC .... *F05D 2250/15* (2013.01); *F05D 2300/603* (2013.01); *Y02T 50/60* (2013.01)

(58) Field of Classification Search
CPC .. F01D 5/284; F01D 25/246; F05D 2300/603; F05D 2300/6033; F05D 2300/6034; F02K 3/06
See application file for complete search history.

(56) References Cited

U.S. PATENT DOCUMENTS

| | | | |
|---|---|---|---|
| 2008/0159851 A1* | 7/2008 | Moniz | F01D 5/147 |
| | | | 415/159 |
| 2010/0080697 A1* | 4/2010 | Wojno | F01D 25/162 |
| | | | 415/208.2 |
| 2013/0287562 A1* | 10/2013 | Ishigure | F02K 3/06 |
| | | | 415/208.1 |
| 2015/0219195 A1 | 8/2015 | Okaji et al. | |
| 2017/0030222 A1 | 2/2017 | De Sousa et al. | |

* cited by examiner

AIR FLOW STRAIGHTENING ASSEMBLY AND TURBOMACHINE INCLUDING SUCH AN ASSEMBLY

CROSS-REFERENCE TO RELATED APPLICATIONS

This application is a 35 U.S.C. § 371 filing of International Application No. PCT/FR2017/051002, filed Apr. 27, 2017, which claims the benefit of priority to French Patent Application No. 1653756, filed Apr. 27, 2016, each of which is incorporated herein by reference in its entirety.

The present invention relates to a stage for straightening an air flow for a turbomachine, and more particularly an air flow straightening assembly positioned downstream of a fan, in a by-pass flow.

A turbofan engine comprises a fan, the output flow of which is divided into a primary flow, directed towards the compressors, the combustion chamber and then the turbines of the turbomachine, and a by-pass flow providing an essential part of the thrust.

In order to reduce the aerodynamic losses and thus improve the thrust, the by-pass flow has to be straightened so that it flows in an axial direction as much as possible.

For this purpose, turbomachines include straightening assemblies comprising stationary vanes commonly called OGV (acronym for Outlet Guide Vane) having a leading edge and a trailing edge between which a pressure side and a suction side extend for straightening the air flow.

With a view to reducing the mass of a turbomachine, some parts usually made of metal are gradually replaced by parts made of a composite material. This is particularly true for straightening stages which may be made of composite materials, since they are positioned in the colder parts of the turbomachine, i.e. upstream of the combustion chamber, and thus are not exposed to high temperatures.

Patent application WO 2014/076408, in the name of the Applicant, discloses, as shown in FIG. 1 of the present application, an assembly 10 for straightening an air flow of a turbomachine, comprising two respectively coaxial radially inner and outer shrouds 12, 14, between which stator vanes 16 attached, at a first end portion 18 thereof, to the radially inner shroud 12 and at a second end portion 20 thereof, to the radially outer shroud 14, extend. The vanes 16 may be made of a composite material and comprise a useful portion 22 extending between the two end portions 18, 20 and defining a pressure side 21 and a suction side 23 for straightening the air flow.

If such an assembly makes it possible to lighten the turbomachine, however it remains perfectible.

Firstly, in order to gain weight, the section of the vanes could be further reduced, however the stresses which the vanes are subjected to in operation do not presently make it possible to reduce the section of the vanes without creating an increased risk of debinding of the fibers composing the layers of the vanes. Secondly, the efficiency of the straightening assembly of the prior art is not optimum. As a matter of fact, the formation of vortices in the vicinity of the backsides of the vanes could be observed, at the attachment of the vanes with the radially inner shroud, with such vortices generating turbulence in the air flow at the outlet of the straightening assembly which reduces the propulsive efficiency of the turbomachine.

Eventually, in operation, the straightening assembly is subjected to a torsional stress about the axis thereof which is applied to the inner shroud or the outer shroud, which tends to rotate the inner shroud relative to the outer shroud.

Thus, simply reducing the weight of the vanes, and more particularly the section thereof, cannot make it possible to increase the mechanical strength of same.

The invention particularly aims at providing a simple, efficient and economical solution to this problem.

To this end, the invention firstly provides for a turbofan engine comprising an upstream impeller and a downstream assembly for straightening an air flow of a by-pass annular jet delimited radially inwards by a radially inner shroud and radially outwards by a radially outer shroud, with vanes made of a composite material extending between the radially inner and outer shrouds and being attached, at a first end portion thereof, to the radially inner shroud and at a second end portion thereof, to the radially outer shroud, with the vanes including an useful portion extending between said first and second end portions and defining a pressure side and a suction side, characterized in that, for each vane in a plane perpendicular to the axis of the radially inner and outer shrouds, a straight line passing through a junction between said first and second end portions and the useful portion forms, with a radius of the radially inner shroud passing through the junction between said first end portion and the useful portion of said vane an angle $\alpha$ such that $0°<\alpha\leq 90°$.

According to a conventional design, the metallic vanes are substantially radial, with the angle $\alpha$ being close to zero degree, and the number of vanes is selected according to straightening aerodynamic efficiency and the mechanical strength characteristics of the straightening assembly. Complex problems then arise to switch from metallic vanes to vanes made of a composite material.

For instance, if composite vanes are longer and/or thicker than metallic vanes to reach suitable mechanical characteristics, the number of vanes may then be too high for all such vanes to be circumferentially accommodated, while keeping suitable aerodynamic characteristics for the straightening assembly.

For engines having large diameters, for instance an outer shroud larger than 2,500 mm, up to 3,000 mm for instance, parameters may be set more freely, specifically because the diameter of the inner shroud, of the order of 1,500 mm or 1,700 mm leaves sufficient space between the vanes to deal with, on the one hand, the aerodynamic issues, and, on the other hand the mechanical stresses, as well as the assembling constraints.

More specifically, design problems arise when trying to bias the vanes relative to the inner shroud, while taking into account the by-pass air flow rates and speed. For instance, when modifying the spacing of the vanes, the constraints related to the creation of wedge vortices, substantially at the roots of the vanes have to be taken into account, while still considering the difficulties resulting from mechanical strength requirements.

Contrary to what is customary for metallic vanes, it has been desired to reduce the number of vanes without affecting however the straightening surface. The drastically reduced number of vanes has not minimized the issues relating to the selection of the diameter of the inner shroud and the inclination of the vanes relative to the inner shroud. The aerodynamic behavior, specifically as regards the separation at the roots of the vanes is then a binding parameter which is added to the other issues.

Besides, the aerodynamic characteristics are specific to the assemblies for straightening the by-pass jet flow downstream of the fan. Thus converting known results for metallic vanes, for instance, used for primary air flows in a turbine, into the output of such primary turbomachine flow, is not plausible.

Such an assembly makes it possible to increase the aerodynamic efficiency of the assembly, and thus the turbomachine, while reducing the mass thereof, and thus, consequently, the impact on the environment thereof.

The orientation of the vanes as defined above, and described in greater details hereunder, enables the vanes to work in traction/compression, to the advantage of a better mechanical strength.

The angle $\alpha$ can be such that $30° < \alpha \leq 90°$.

The above-mentioned straightening assembly may include from 16 to 24 vanes. The assembly preferably comprises 20 vanes. For a straightening assembly with vanes made of a composite material with about twenty vanes, the results are convincing, unlike the usual ones.

The external diameter of the radially inner shroud can be at least 1,000 mm.

The external diameter of the radially inner shroud can be less than 1,300 mm.

Particularly advantageous results have been obtained for:
The small diameters of the inner shroud as defined above;
A very low number of vanes relative to the usual metallic solutions, i.e. about twenty vanes; and
More or less significant and non conventional inclinations of the vanes relative to the inner shroud, as mentioned above.

Design constraints are then reduced, on the one hand as regards the thickness and the dimensions of the vane chords, and, on the other hand, as regards the geometry of the vanes, i.e. the twist thereof, the shape of their aerodynamic profiles, the profile stacking rule, for instance.

According to one embodiment, at least one of the first end portion or the second end portion is bent in a first direction, in the circumferential direction relative to the useful portion of the vane.

According to one embodiment, said first circumferential direction is directed towards the suction side of an adjacent vane.

According to one embodiment, the second end portion of the vane is bent and oriented towards the pressure side of an adjacent vane. This configuration is particularly interesting since it makes it possible to have the end of the vane work in compression, or in traction, rather than in flexion.

According to one embodiment, the first end portion extends substantially as the extension of the useful portion of the vane.

According to one embodiment, said first and second end portions are bent in the same circumferential direction.

According to one embodiment, the second end portion comprises a first strip for connection to the radially outer shroud bent in the first circumferential direction relative to the useful portion of the vane and a second strip for connection to the radially outer shroud bent in a second circumferential direction opposite the first circumferential direction.

According to one embodiment, the assembly comprises at least one hollow arm for the passage of ancillary equipment arranged in the downstream extension of a vane.

Advantageously, the angle $\alpha$ is such that $80° < \alpha \leq 90°$, which a particularly effective value if $\alpha = 90°$.

The invention will be better understood and other details, characteristics and advantages of the invention will become apparent from reading the following description given by way of non restrictive example with reference to the appended drawings in which.

Figure 1:
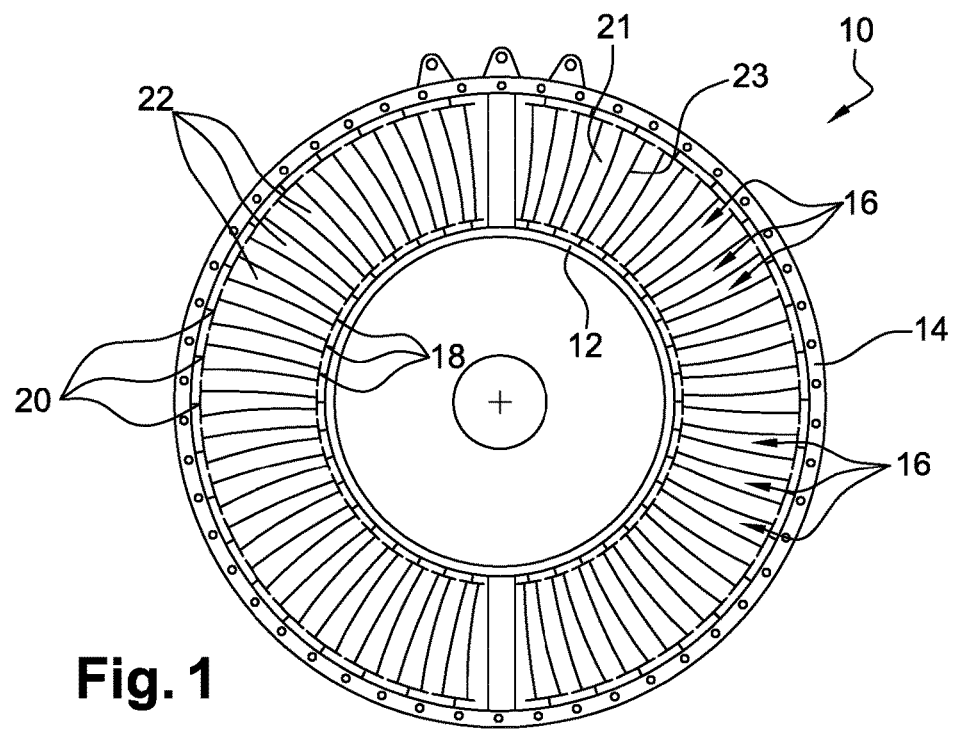
FIG. 1 is a schematic front view of a straightening assembly of the prior art.
Figure 2:
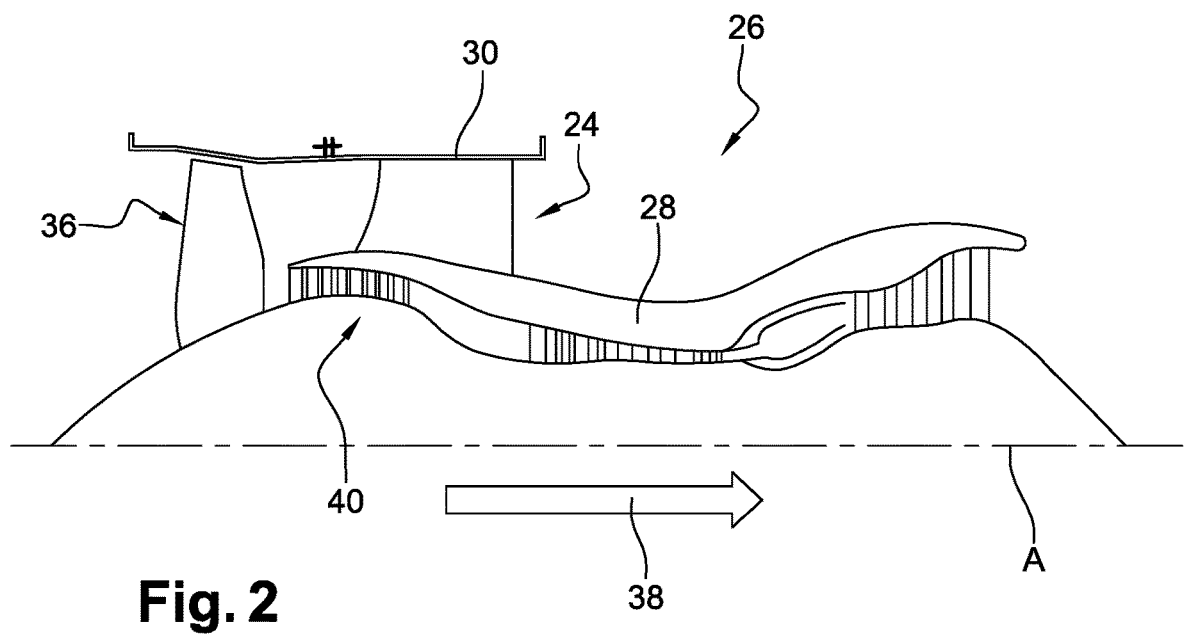
FIG. 2 is a simplified half-section of a turbomachine comprising a straightening assembly according to the invention.
Figure 3:
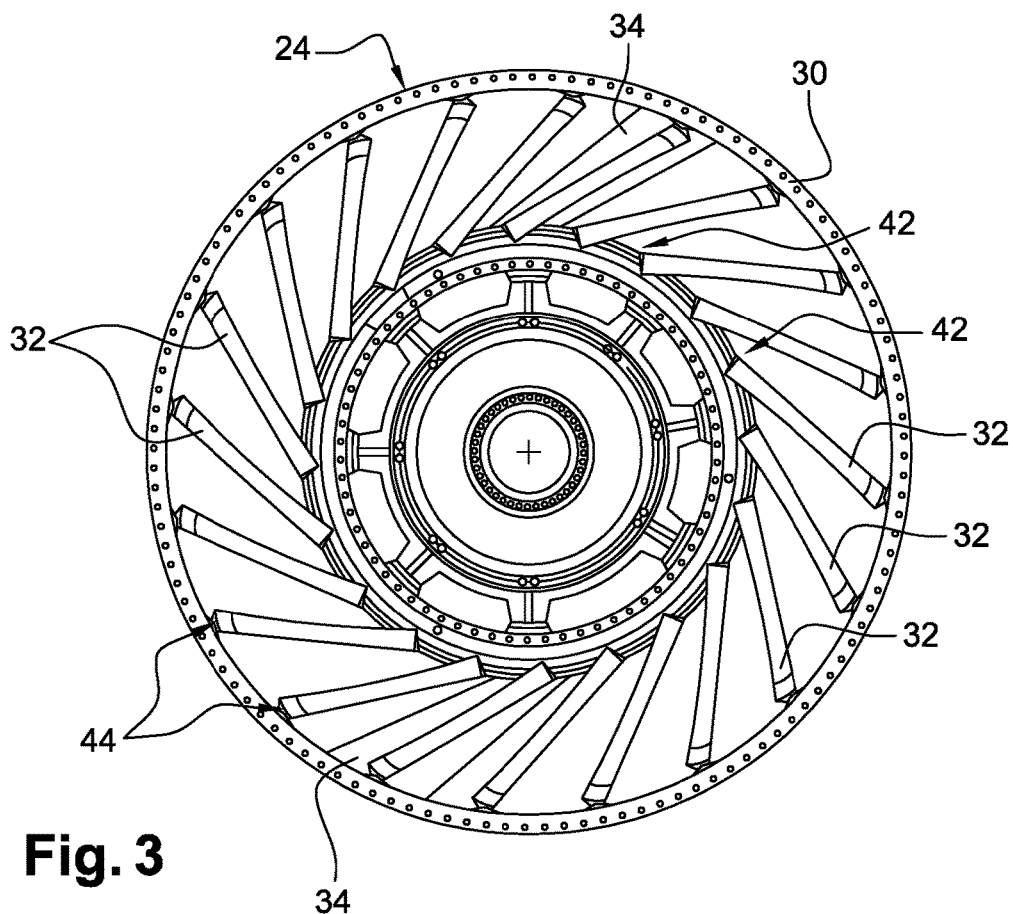
FIG. 3 is a simplified front view of the straightening assembly according to the invention, according to a first embodiment.

FIG. 3 schematically shows a front view of a first embodiment of an assembly 24 for straightening an air flow or air stream in a by-pass air flow of a turbomachine 26, and FIG. 2 shows a half-section of a turbomachine 26 comprising said straightening assembly 24.

This assembly 24 comprises two respectively coaxial radially inner and outer shrouds 28, 30, between which the vanes 32 extend. Advantageously, the vanes 32 are made of a composite material so as to reduce the mass of the straightening assembly 24.

Preferably, the outer shroud 30 has a diameter ranging from 1,500 to 2,500 mm, and the inner shroud 28 has a diameter ranging from 1,000 to 1,300 mm, preferably of less than 1,300 mm.

In addition, the assembly 24 comprises at least one hollow arm for the passage of ancillary equipment such as, for instance, transmission means or fluid lines. In a particular embodiment shown in FIG. 3, the assembly 24 comprises two hollow arms 34 for the passage of ancillary equipment extending as the downstream extension of a vane 32, so that the by-pass air flow is only slightly impacted by the presence of the arms 34. According to the particular embodiment of FIG. 3, there are two hollow arms 34 opposite one another and respectively positioned at 6 o'clock and 12 o'clock on a dial. However, the assembly 24 could include one single arm 34 or on the contrary a higher number, for example three, without these being angularly equidistantly distributed. In an alternative solution, the assembly 24 could comprise no arm 34.

The arms 34 may advantageously comprise a profile with a widened downstream part in order to further reduce the disturbances caused by the presence of arms 34. Similarly, a fairing may be positioned between the vane 32 and the hollow arm 34 in order to guide the air flow and obviate the formation of turbulences axially between one arm and the vane arranged upstream.

As can be seen in the simplified half-section of the turbomachine 26, in FIG. 2, the straightening assembly 24 is positioned downstream of an impeller 36 along the arrow 38 showing the direction of the air flow in the turbomachine 26, with the radially inner shroud 28 surrounding a low pressure compressor 40.

The vanes 32 of the straightening assembly 24 are attached, at a first end portion 42 thereof to the radially inner shroud 28 and at a second end portion 44 thereof to the radially outer shroud 30, and comprise a useful portion 46 which extends between the two end portions 42, 44 and defines a pressure side 48 and a suction side 50 for straightening the by-pass flow such that the by-pass flow substantially flows in a laminar manner downstream of the straightening assembly 24.

On the vanes 32, the pressure side 48 is oriented towards the radially outer shroud 30 and the suction side 50 is oriented towards the radially inner shroud 28.

FIGS. 5a to 5d show a schematic sectional view of a vane 32 along a cutting plane perpendicular to an axis of revolution A-A of the turbomachine 26.

One straight line is drawn (reference "d" in FIGS. 5a-5d) passing through the junction between said first and second end portions 42, 44 and the useful portion 46 of the vane 32, with such line forming with a radius of the radially inner shroud 28, passing through the junction between the first end portion 42 and the useful portion 46 of said vane 32, an angle $\alpha$ such that $0°<\alpha\leq 90°$, and preferably from 80° to 90°, and in particular as close to 90° as possible. For example, $\alpha=90°$ is an effective value, for which the vanes 32 are tangent to the inner shroud 28, substantially from the roots thereof on.

Forming an angle $\alpha$ between the useful portion 46 of the vane 32 and the radius R of the radially inner shroud 28 thus makes it possible to limit the creation of wedge vortices between the suction side 50 of the vane 32 and the pressure side 48 of an immediately adjacent vane 32, at the inner shroud. This then results in a better air flow and thus a better performance of the turbomachine 26.

Moreover, the angle $\alpha$ also makes it possible to increase the service life of the vanes 32 relative to the composite vanes 32 of the prior art. As a matter of fact, composite materials offer enhanced tensile and compressive strength.

In the first embodiment illustrated in FIG. 3, the angle $\alpha$ is about 60° and the assembly 24 comprises twenty vanes 32.

Figures 4A, 4B:
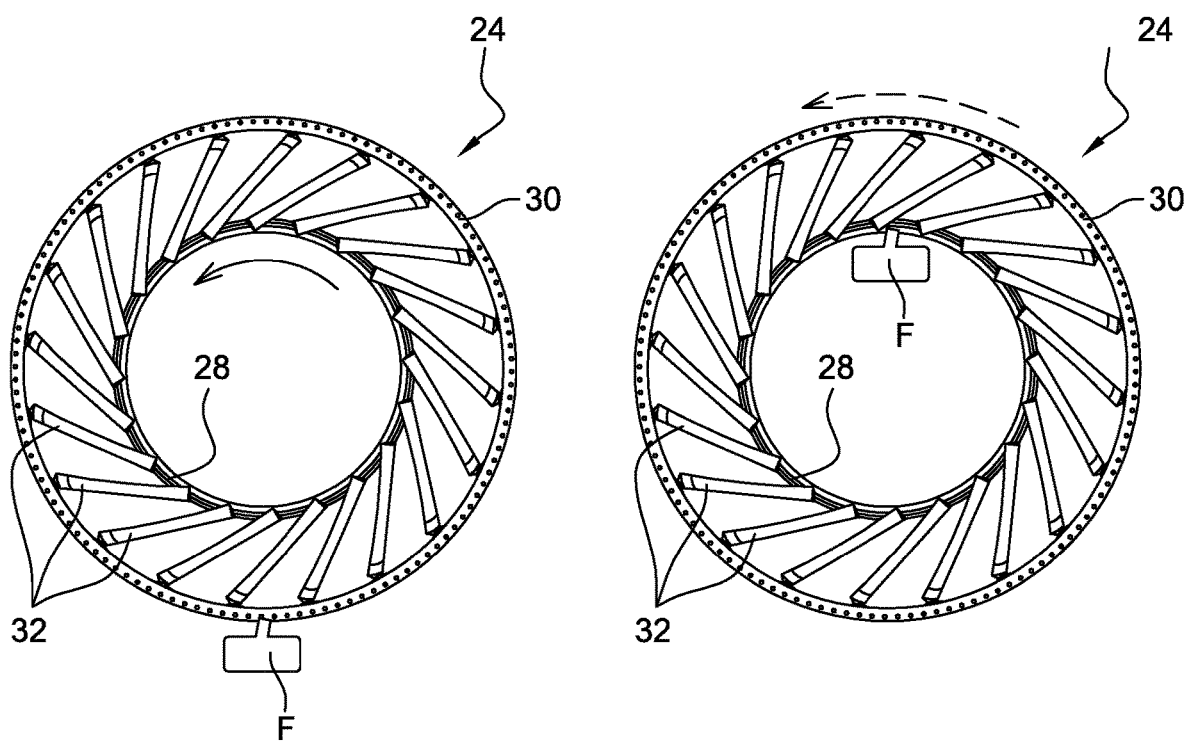
FIG. 4a is a schematic view showing the attachment of the turbomachine according to a first alternative solution.
FIG. 4b is a schematic view showing the attachment of the turbomachine according to a second alternative solution.

FIGS. 4a and 4b show two types of attachments F for the turbomachine 26 on an aircraft, with the attachments F being schematically shown in the Figures. In the first type shown in FIG. 4a, the turbomachine 26 is attached to the aircraft by its radially outer shroud 30. Then, in operation, the rotation of the impeller 36 causes, as shown by the arrow in solid lines in FIG. 4a, a torsional stress onto the shroud, which tends to rotate the radially inner shroud 28 in the counterclockwise direction when viewed in the air flow direction. Such rotational movement then makes the vanes 32 of the assembly 24 of the prior art work in flexion. On the other hand, in the assembly 24 of the present invention, the vanes 32 work in traction.

In the second type shown in FIG. 4b, the turbomachine 26 is attached to the aircraft by its radially inner shroud 28. Then, in operation, the rotation of the impeller 36 causes, as shown by the dotted arrow in FIG. 4a, a torsional stress onto the shroud, which tends to rotate the radially outer shroud 30 counterclockwise in the air flow direction. Such rotational movement also makes the vanes 32 of the assembly 24 of the prior art work in flexion. On the other hand, in the assembly 24 of the present invention, the vanes 32 work in compression. It should be noted here that the assembly 24 illustrated in FIGS. 4a and 4b is an assembly according to the first embodiment of the invention, i.e. it comprises twenty vanes 32, each forming an angle $\alpha$ of about 60 degrees.

FIGS. 5a to 5d also highlight various modes for attaching the vanes 32 to the radially inner and outer shrouds 28, 30.

The first end portion 42 and the second end portion 44 used for attaching the vane 32 onto the radially inner shroud 28 and the radially outer shroud 30, respectively, may be bent, so as to ensure compliance with the angle $\alpha$.

Thus, at least one of the end portions 42, 44 may be bent in a first circumferential direction relative to the useful portion 46 of the vane 32. Said first circumferential direction is oriented towards the suction side 50 of an adjacent vane.

However, each end portion 42, 44 can also be bent in a second circumferential direction towards the pressure side 48 of an adjacent vane 32.

Eventually, at least one of the end portions 42, 44 may extend substantially as the extension of the useful portion 46 of the vane 32.

Figure 5A:
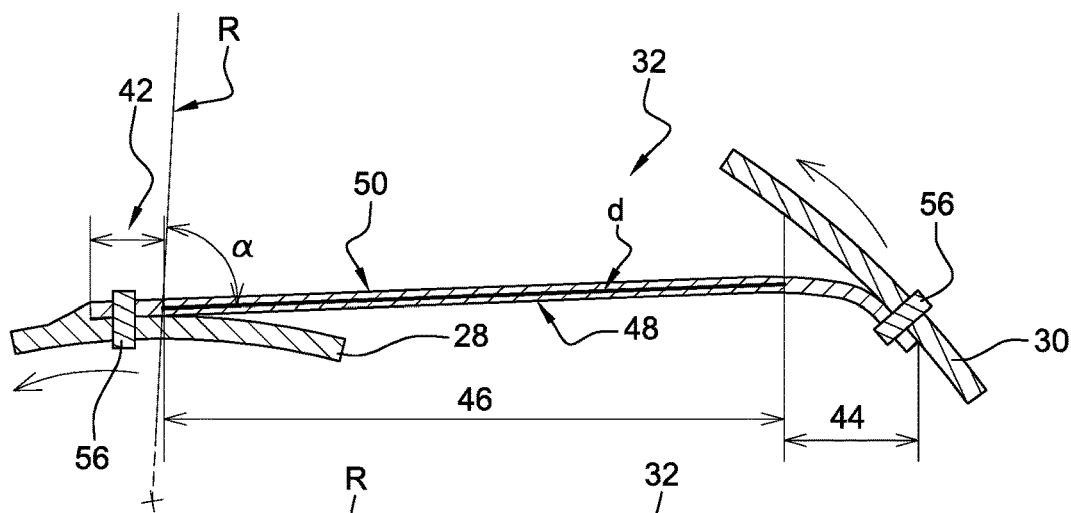
FIG. 5a is a schematic view showing the attachment of a vane of the straightening assembly of FIG. 3 according to a first alternative solution.

In a first attaching mode shown in FIG. 5a, the first end portion 42 substantially extends as the extension of the useful portion 46 of the vane 32 and the second end portion 44 is bent in the first circumferential direction. Such attaching method is ideal since it makes it possible to obviate any debinding of the layers of fibers composing the vanes 32, at right angles with the point of attachment thereof onto the shrouds 28, 30.

Figure 5B:
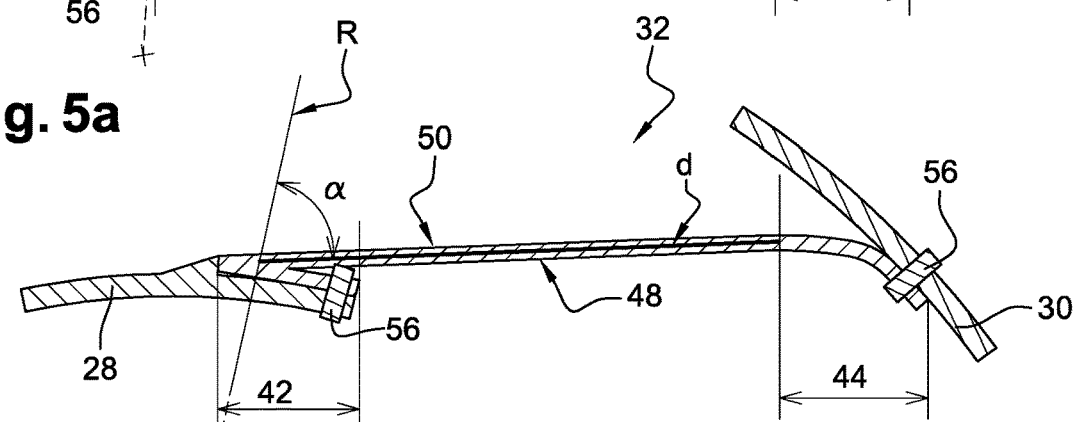
FIG. 5b is a schematic view showing the attachment of a vane of the straightening assembly of FIG. 3 according to a second alternative solution.

In a second attaching mode shown in FIG. 5b, the two end portions 42, 44 of the vane 32 are bent in the first circumferential direction. More specifically, the first end portion 42 is bent so as to firstly form a fold towards the useful portion 46 of the vane 32 and then substantially follow the contour of the radially inner shroud 28.

Figure 5C:
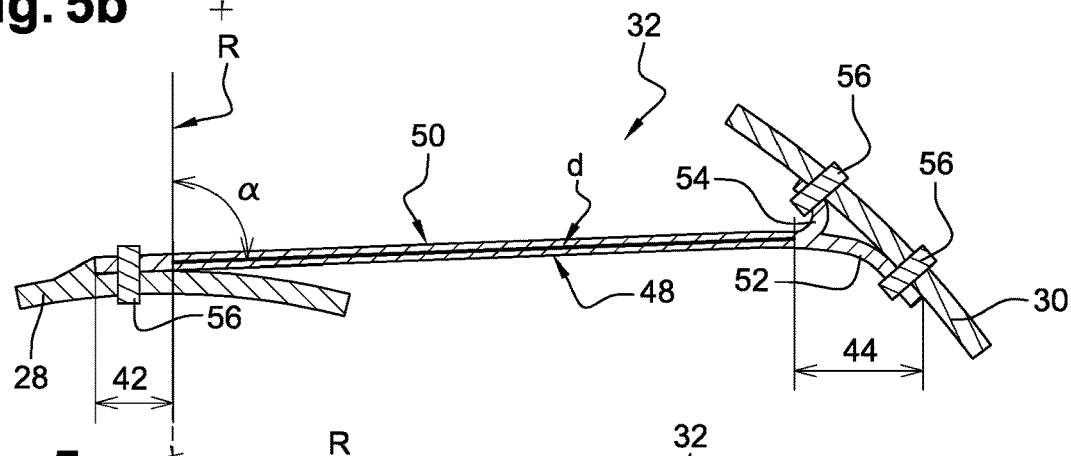
FIG. 5c is a schematic view showing the attachment of a vane of the straightening assembly of FIG. 3 according to a third alternative solution.

In a third attaching mode shown in FIG. 5c, the first end portion 42 substantially extends as the extension of the useful portion 46 of the vane 32 and the second end portion 44 is split into two connecting strips also called debinding strips 52, 54. A first connecting strip 52 is bent in the first circumferential direction, i.e. in the circumferential direction relative to the useful portion 46 of the vane 32 towards the suction side 50 of an adjacent vane 32, and a second connecting strip 54 is bent in a second circumferential direction opposite the first circumferential direction.

Figure 5D:
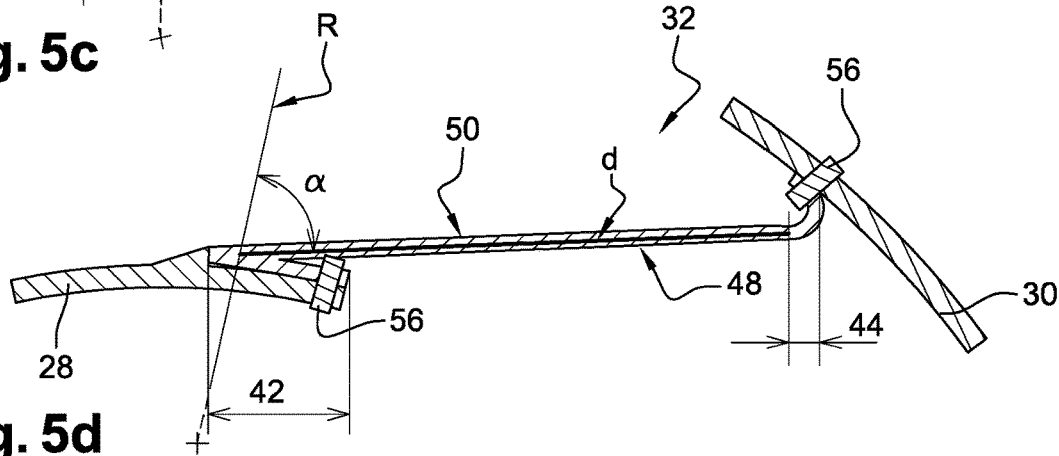
FIG. 5d is a schematic view showing the attachment of a vane of the straightening assembly of FIG. 3 according to a fourth alternative solution.

In a fourth attaching mode shown in FIG. 5d, the first end portion 42 is bent in the first circumferential direction and the second end portion 44 is bent in the second circumferential direction. More specifically, the first end portion 42 is bent so as to firstly form a fold towards the useful portion 46 of the vane 32 and then to substantially follow the contour of the radially inner shroud 28.

The vanes 32 are advantageously attached to the radially inner and outer shrouds 28, 30 by bolting 56 the end portions 42, 44, the connecting strips 52, 54 if need be, on said radially inner and outer shrouds 28, 30.

This attaching mode is advantageous in that it provides a good mechanical strength with respect to the forces which the vane 32 is exposed to, and enables a rapid mounting and dismounting with a view to facilitate and speed up the maintenance operations.

Figure 6:
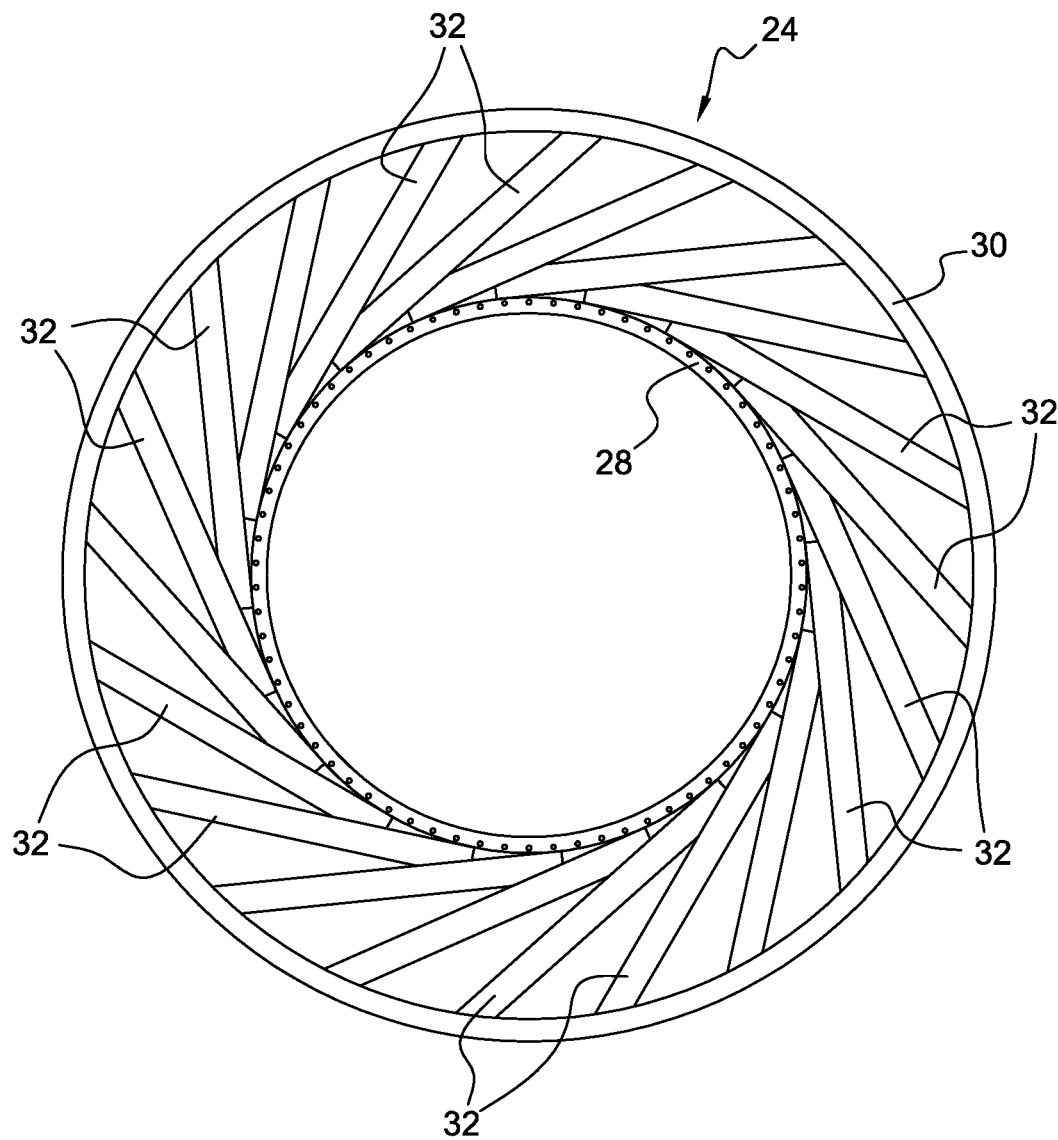
FIG. 6 is a front view of the straightening assembly according to the invention, according to a second embodiment.

FIG. 6 illustrates a second embodiment of the assembly 24, wherein the outer shroud 30 has a diameter ranging from 1,500 to 2,500 mm, and the inner shroud 28 has a diameter ranging from 1,000 to 1,300 mm, preferably of less than 1,300 mm.

Besides, the assembly 24 according to the second embodiment comprises from 16 to 24 vanes 32, and more specifically twenty vanes 32, each having an angle $\alpha$ of 80°. It can be seen, in FIG. 6, that the roots, i.e. the junctions of the vanes 32 with the inner shroud 28, of two immediately successive vanes 32 overlap. As a matter of fact, when manufactured, the vanes have a three dimensional shape (specifically a twisted shape), wherein the upstream portion of the vanes 32 roots, i.e. the leading edges thereof, is circumferentially offset relative to the back portion of the vanes 32 roots. Thus, in a front view of the assembly 24, like FIG. 6, it can be seen that the vanes 32 roots overlap.

Independently of the selected embodiment, the assembly 24 for straightening an air flow and the turbomachine 26 which have just been described have numerous advantages, among which:

a higher mechanical strength of the vanes 32;

a better aerodynamic efficiency;

a gain in mass and a lower impact on the environment; and reduced manufacturing costs and easy maintenance.

The good mechanical strength of the vanes 32 is provided by the positioning of the vanes 32, specifically thanks to the angle α, which makes it possible for the vanes 32 to work in tension or in compression, depending on the type of attachment of the turbomachine 26. Unlike the vanes 32 of the prior art which mainly work in flexion, the vanes 32 of this straightening assembly 24 have a longer service life and a greater resistance to fatigue.

The aerodynamic efficiency is improved, as compared to the prior art, by the positioning of the vanes 32, specifically thanks to the angle α, which makes it possible to expand the suction side 50 of the vanes 32 and thus the useful portion 46 of the vanes 32. Furthermore, the presence of the angle α between 0 and 90° greatly reduces or even eliminates the effects of wedge vortices at the roots of the vanes 32. A substantially laminar air flow which increases the performances of the turbomachine 26 can thus be obtained.

The performances of the turbomachine 26 are also increased by the mass reduction and, accordingly, the reduction in consumption. As a matter of fact, the presence of an angle α as defined, which makes it possible to enlarge the useful portion 46 of the vanes 32, enhances the quality of straightening of the air flow. Therefore, a smaller number of vanes 32 is required for a proper operation of the straightening assembly 24. Reducing the number of vanes 32 de facto results in a reduced mass of the straightening assembly 24 and, consequently, reduces the energy consumption of the turbomachine 26, so that the turbomachine 26 has a lower environmental impact. Besides, using composite materials, as compared to using metallic materials, also reduces the mass of the turbomachine 26.

Eventually, manufacturing and maintenance costs are also reduced since the number of vanes 32 to be manufactured and maintained is smaller. On the other hand, a quick attachment, by bolting 56 the vanes 32 on the radially inner and outer shrouds 28, 30 favors a quick response from the maintenance technicians. In addition, the work in tension or in compression of the vanes 32 also reduces the deterioration of the vanes 32, which reduces the frequency of preventive and/or curative maintenance periods.

The invention claimed is:

1. A turbofan engine (26) comprising an upstream impeller (36) and a downstream assembly (24) for straightening an air flow of a by-pass annular jet delimited radially inwards by a radially inner shroud (28) and radially outwards by a radially outer shroud (30) with vanes (32) made of a composite material extending between the radially inner and outer shrouds (28, 30) and being attached, at a first end portion (42) thereof, to the radially inner shroud (28) and at a second end portion (44) thereof, to the radially outer shroud (30), with the vanes (32) including a useful portion (46) extending between said first and second end portions (42, 44) and defining a pressure side (48) and a suction side (50), characterized in that, for each vane (32) in a plane perpendicular to the axis of the radially inner and outer shrouds (28, 30), a straight line passing through a junction between said first and second end portions (42, 44) and the useful portion forms, with a radius of the radially inner shroud (28) passing through the junction between said first end portion (42) and the useful portion (46) of said vane (32) an angle α such that 80°<α≤90°.

2. The turbofan engine (26) according to claim 1, characterized in that the diameter of the radially inner shroud (28) is at least 1,000 mm.

3. The turbofan engine (26) according to claim 2, characterized in that the diameter of the radially inner shroud (28) is less than 1,300 mm.

4. The turbofan engine (26) according to claim 1, characterized in that at least one of the first end portion (42) or the second end portion (44) is bent in a first direction, in the circumferential direction relative to the useful portion (46) of the vane (32).

5. The turbofan engine (26) according to claim 4, characterized in that said first circumferential direction is directed towards the suction side (50) of an adjacent vane (32).

6. The turbofan engine (26) according to claim 5, characterized in that the second end portion (44) of the vane (32) is bent and oriented towards the pressure side (48) of an adjacent vane (32).

7. The turbofan engine (26) according to claim 5, characterized in that the first end portion (42) extends as the extension of the useful portion (46) of the vane (32).

8. The turbofan engine (26) according to claim 4, characterized in that the first end portion (42) extends as the extension of the useful portion (46) of the vane (32).

9. The turbofan engine (26) according to claim 8, characterized in that the second end portion (44) comprises a first strip (52) for connection to the radially outer shroud (30) bent in the first circumferential direction relative to the useful portion (46) of the vane (32) and a second strip (54) for connection to the radially outer shroud (30) bent in a second circumferential direction opposite the first circumferential direction.

10. The turbofan engine (26) according to claim 1, characterized in that said first and second end portions (42, 44) are bent in the same circumferential direction.

11. The turbofan engine (26) according to claim 1, characterized in that the second end portion (44) comprises a first strip (52) for connection to the radially outer shroud (30) bent in a first circumferential direction relative to the useful portion (46) of the vane (32) and a second strip (54) for connection to the radially outer shroud (30) bent in a second circumferential direction opposite the first circumferential direction.

12. The turbofan engine (26) according to claim 1, characterized in that said assembly comprises at least one hollow arm (34) for the passage of ancillary equipment arranged in the downstream extension of a vane (32).

13. The turbofan engine (26) according to claim 1, characterized in that said turbofan engine (26) comprises from 16 to 24 vanes (32).

* * * * *